(12) United States Patent
Hedman

(10) Patent No.: US 8,524,373 B2
(45) Date of Patent: Sep. 3, 2013

(54) GYPSUM PLASTERBOARD WITH A COATING SLIP AND METHOD OF MANUFACTURING

(75) Inventor: Goran Erik Hedman, Gordes (FR)

(73) Assignee: LaFarge Platres, Avignon (FR)

( * ) Notice: Subject to any disclaimer, the term of this patent is extended or adjusted under 35 U.S.C. 154(b) by 1266 days.

(21) Appl. No.: 11/571,446

(22) PCT Filed: Jun. 29, 2005

(86) PCT No.: PCT/FR2005/001646
§ 371 (c)(1),
(2), (4) Date: Aug. 17, 2009

(87) PCT Pub. No.: WO2006/010853
PCT Pub. Date: Feb. 2, 2006

(65) Prior Publication Data
US 2009/0297826 A1    Dec. 3, 2009

(30) Foreign Application Priority Data
Jun. 30, 2004  (FR) ..................................... 04 07272

(51) Int. Cl.
*B32B 23/04*       (2006.01)
(52) U.S. Cl.
USPC ..................... 428/532; 428/537.5; 428/537.7
(58) Field of Classification Search
USPC .................................... 428/532, 537.5, 537.7
See application file for complete search history.

(56) References Cited

U.S. PATENT DOCUMENTS

| 5,902,453 | A | * | 5/1999 | Ruch | ............................. | 162/135 |
| 7,414,085 | B2 | * | 8/2008 | Colbert et al. | ................ | 524/425 |

FOREIGN PATENT DOCUMENTS

| EP | 0521804 | | 1/1993 |
| WO | WO98/20201 | * | 5/1998 |
| WO | WO99/63157 | * | 12/1999 |

* cited by examiner

*Primary Examiner* — Leszek Kiliman
(74) *Attorney, Agent, or Firm* — Jason A. Berstein; Barnes & Thornburg LLP

(57) ABSTRACT

A gypsum plasterboard with a covering paper forming the outside of the plasterboard and a coating slip deposited on the covering paper. The coating slip has plastic pigments as whitening agent.

21 Claims, 7 Drawing Sheets

Fig. 1

Environmental conditions of the trial: 23°C/50%RH

Paper type: Paper coated with coating slip as set forth in the present invention

|  |  | Uncoated paper | Coated paper | Plasterboard Plant 1 | Plasterboard Plant 2 |
|---|---|---|---|---|---|
| Paintability |  |  |  |  | Good |
| Wallpaper removal | twice |  |  |  | Good |
| Sanding resistance | strong |  |  | 0.2 g | 0.2 g |
| Colour Measurements | L | 84.27 | 89.23 | 88.17 |  |
|  | a* | 0.60 | 0.00 | -0.15 |  |
|  | b* | 2.35 | 1.65 | 4.28 |  |
|  | YI | 5.47 | 3.33 | 8.48 |  |
| Gloss | 85° angle | 2.8 | 6.9 | 7.1 | 6.4 |
| Grammage | g/m² | 192.0 | 221.0 |  |  |
| Density | kg/m³ | 711.0 | 762.0 |  |  |
| Porosity | sec/100ml | 67.4 | 137.8 |  |  |
| Cobb(60) | top | 32 | 14 |  | 6 |
| Dennison Pick test | top | 17 | 15 |  | 13 |

Fig. 2

Example 1 of the realisation of a coating slip composition

| Half Batch | Product Name | Chemical Composition | Function | Form | DM % | Weight (kg) of dry matter | Total weight DM + liquid fraction | Parts | % |
|---|---|---|---|---|---|---|---|---|---|
| 1 | Water | Water | | Liquid | | | 80 | | |
| 2 | EW902 | Calciumcarbonate | Filler | Dispersion | 75 | 126.0 | 168 | 65.03 | 43.94 |
| 3 | Dispex N-40 | | Dispersing agent | Liquid | 40 | 0.48 | 1.2 | 0.25 | 0.16 |
| 4 | Titanium dioxide | Titanium Dioxide | Filler | Powder | 99 | 29.0 | 29.3 | 14.97 | 10.11 |
| 5 | Etingal S | Phosphorics Esters | Defoamer | Liquid | 100 | 0.3 | 0.3 | 0.15 | 0.10 |
| 6 | NaOH | Sodiumhydroxide | Fluidifier / pH agent | Powder | 100 | 2.60 | 2.60 | 1.34 | 0.90 |
| 7 | Ropaque | Plastic Pigment | Filler | Liquid | 28.5 | 38.76 | 1.36 | 20.00 | 13.51 |
| 8 | Ammonia | Ammonia | Fluidifier | Liquid | 20 | 0.01 | 0.07 | 0.01 | 0.003 |
| 9 | Amilys 108P | Oxidised Maize Starch | Binder | Powder | 85 | 43.0 | 50.0 | 22.19 | 14.99 |
| 10 | Latexia305 | Styrene-butadiene | Binder | Liquid | 50 | 45 | 90 | 23.22 | 15.69 |
| 11 | Basocoll OV | Aliphatic Epoxy Resin | Insolubiliser/ Crosslinker | Liquid | 100 | 0.80 | 0.80 | 0.41 | 0.27 |
| 12 | Surfasept 440 | Organosulphur/Azotee | Biocide | Liquid | 45 | 0.77 | 1.70 | 0.40 | 0.26 |
| Total | | | | | | 286.7 | 560.0 | 148.0 | 99.933 |
| DM | | | | | | | 640.0 | 44.6 | |

Fig. 3

Example 2 : Coating Colour Formulation

| | Product Name | Chemical Composition | Function | Supplier | Form | Dry Solids % | Dry Amount Addition kg | Addition As is. Kg | Parts | % |
|---|---|---|---|---|---|---|---|---|---|---|
| 1 | Water | Water | | | Liquid | | | 140 | 65.03 | 43.939 |
| 2 | Carbital 90-P | Calciumcarbonate | Filler | AGS-BMP | Dispersion | 75 | 252.0 | 336 | 0.25 | 0.169 |
| 3 | Dispex N-40 | | Dispersing agent | | Liquid | 40 | 0.96 | 2.4 | 14.97 | 10.115 |
| 4 | Titanium Dioxide | Titanium Dioxide | Filler | | Powder | 99 | 58.0 | 58.6 | 0.15 | 0.101 |
| 5 | Etingal S | Phosphoric Esters | Defoamer | BASF | Liquid | 100 | 0.6 | 0.6 | 1.34 | 0.905 |
| 6 | NaOH | Sodiumhydroxide | Fluidifier / PH agent | ENI Chem | Powder | 100 | 5.20 | 5.20 | 20.00 | 13.513 |
| 7 | Ropaque | Plastic Pigment | Filler | Rohm & Haas | Liquid | 28.5 | 77.52 | 272 | 0.01 | 0.007 |
| 8 | Ammonia | Ammonia | Fluidifier | Langlois Chemie | Liquid | 20 | 0.03 | 0.14 | 22.19 | 14.993 |
| 9 | Stabilys DO29 | Oxidised Maize Starch | Binder | Roquette | Powder | 86 | 86.0 | 100.0 | 23.22 | 15.689 |
| 10 | Latexia 305 | Styrene-butadiene | Binder | Latexia | Liquid | 50 | 90 | 180 | 0.41 | 0.277 |
| 11 | Basocoll OV | Aliphatic Epoxy Resin | Insolubiliser/ Crosslinker | BASF | Liquid | 100 | 1.60 | 1.60 | 0.39 | 0.263 |
| 12 | Surfasept 440 | Organosulphur/ Azotee | Biocide | Nalco | Liquid | 45 | 1.53 | 3.40 | 148.0 | 100.000 |
| Total | | | | | | | 573.5 | 1099.9 | | |
| Dry Content | | | | | | | | 1239.0 | 46.3 | |

Fig. 4

Example 3 : Coating Colour Formulation

| Half Batch | Product Name | Chemical Composition | Function | Supplier | Form | Dry Solids % | Dry Amount Addition kg | Addition As is. kg | Parts | % |
|---|---|---|---|---|---|---|---|---|---|---|
| 1 | Water | Water | | | Liquid | | | 50 | 65.03 | 52.233 |
| 2 | Carbital 90-P | Calciumcarbonate | Filler | AGS-BMP | Dispersion | 75 | 126.0 | 168 | 65.03 | 52.233 |
| 3 | Dispex N-40 | | Dispersing agent | | Liquid | 40 | 0.48 | 1.2 | 0.25 | 0.201 |
| 4 | Titanium Dioxide | Titanium Dioxide | Filler | | Powder | 99 | 29.0 | 29.3 | 14.97 | 12.024 |
| 5 | Etingal S | Phosphoric Esters | Defoamer | BASF | Liquid | 100 | 0.3 | 0.3 | 0.15 | 0.120 |
| 6 | NaOH | Sodiumhydroxide | Fluidifier | ENI Chem | Powder | 100 | 0.15 | 0.15 | 0.08 | 0.064 |
| 7 | Ropaque | Plastic Pigment | Filler | Rohm & Haas | Liquid | 28.5 | 38.76 | 136 | 20.00 | 16.064 |
| 8 | Ammonia | Ammonia | Fluidifier | Langlois Chemie | Liquid | 20 | 0.01 | 0.07 | 0.01 | 0.008 |
| 9 | Latexia 305 | Styrene-butadiene | Binder | Latexia | Liquid | 50 | 45 | 90 | 23.22 | 18.651 |
| 10 | Basocoll OV | Aliphatic Epoxy Resin | Insolubiliser/Crosslinker | BASF | Liquid | 100 | 0.80 | 0.80 | 0.41 | 0.329 |
| 11 | Surfasept 440 | Organosulphur/Azotee | Biocide | Nalco | Liquid | 45 | 0.77 | 1.70 | 0.39 | 0.313 |
| Total | | | | | | | 241.3 | 477.5 | 124.5 | 100.000 |
| Dry Content | | | | | | | | 527.5 | 45.7 | |

Fig. 5

|  |  | Example 2 Basepaper | Example 2 Coated Paper | Example 3 Coated Paper | Example 2 Plasterboard | Example 3 Plasterboard |
|---|---|---|---|---|---|---|
| Jointing Compound Adhesion |  |  |  |  | Good | Very Good |
| Paintability |  |  |  |  | Good | Poor |
| Wallpaper Removal | Two times |  |  |  | Good | Good |
| Sanding Resistance | Good/Poor |  |  |  | Good | Average |
| Colour Measurements | L | 82.39 | 87.96 | 91.73 | 88.49 | 90.96 |
|  | a* | 1.14 | 0.23 | -0.11 | -0.10 | -0.23 |
|  | b* | 0.71 | 0.08 | 0.08 | 3.42 | 1.25 |
|  | YI | 2.52 | 0.36 | 0.07 | 6.81 | 2.29 |
| Gloss | Angle de 85° | 4.80 | 12.20 | 29.30 | 8.40 | 41.90 |
| Whiteness after painting 1 | L |  |  |  | 94.66 | 94.55 |
| UV-Test 12 hours | L |  |  |  | 88.25 | 90.91 |
|  | YI | 4.29 | 2.00 | 0.89 | 7.63 | 2.93 |
| Porosity | sec/100 ml | 61,6 - 63,9 | 262,5 - 227 | 248 - 203 |  |  |
| Cobb (60) 1 minute | Top | 20-21-20 | 10-9,5-9 | 4-4-3 | 4-6-6 | 2-3-3 |
| Drop Test | min/sec |  |  |  | 2h | > 2h 30 |
| Dennison Pick test | Top | 19 | 15 | < 8 | 13 | 15 |

Fig. 6

Example 4: Coating Colour Formulation

| | Product Name | Chemical Composition | Function | Supplier | Form | Dry Solids % | Dry Amount Addition kg | Addition As is. Kg | Parts | % |
|---|---|---|---|---|---|---|---|---|---|---|
| 1 | Water | Water | | | Liquid | | | 50 | 0.41 | 0.340 |
| 2 | Dispex N-40 | | Dispersing agent | | Liquid | 40 | 0.8 | 2 | 20.14 | 16.686 |
| 3 | Carbital 90-P | Calciumcarbonate | Filler | Minerys | Liquid | 75 | 39 | 52 | 59.89 | 49.619 |
| 4 | Durcal 10 | Calciumcarbonate | Filler | OMYA | Powder | 100 | 116.0 | 116 | 14.97 | 12.403 |
| 5 | Titanium Dioxide | Titanium Dioxide | Filler | | Powder | 99 | 29.0 | 29.3 | 0.15 | 0.124 |
| 6 | Etingal S | Phosphoric Esters | Defoamer | BASF | Liquid | 100 | 0.3 | 0.3 | 0.10 | 0.083 |
| 7 | NaOH | Sodiumhydroxide | Fluidifier | ENI Chem | Powder | 100 | 0.20 | 0.20 | 5.00 | 4.142 |
| 8 | Ropaque | Plastic Pigment | Filler | Rohm & Haas | Liquid | 28.5 | 9.69 | 34 | 0.01 | 0.008 |
| 9 | Ammonia | Ammonia | Fluidifier | Langlois Chemie | Liquid | 20 | 0.02 | 0.1 | 4.00 | 3.314 |
| 10 | Soya Protein | Soya Protein | Crosslinker | Du Pont | Powder | 90 | 7.74 | 8.6 | 14.97 | 12.403 |
| 11 | Water | Water | | | Liquid | | | 40.0 | | |
| 12 | Latexia 305 | Styrene-butadiene | Binder | Latexia | Liquid | 50 | 29 | 58 | 0.57 | 0.472 |
| 13 | Basocoll OV | Aliphatic Epoxy Resin | Insolubiliser/Crosslinker | BASF | Liquid | 100 | 1.10 | 1.10 | 0.39 | 0.323 |
| 14 | Surfasept 440 | Organosulphur/Azotee | Biocide | Nalco | Liquid | 45 | 0.77 | 1.70 | 0.10 | 0.083 |
| 15 | Silicone RE 29 | Polysiloxane | Hydrophobiser | Witco | Liquid | 43 | 0.19 | 0.45 | 120.7 | 100.000 |
| Total | | | | | | | 233.8 | 393.8 | 55.2 | |
| Dry Content | | | | | | | | 423.8 | | |

Fig. 7

Example 4

|  |  | Basepaper | Coated paper | Boards |
|---|---|---|---|---|
| Paintability |  |  |  | Good |
| Sanding Resistance | Good/Poor |  | Good | Good |
| Colour Measurements | L | 84.86 | 88.35 | 88.03 |
|  | a* | 0.47 | -0.10 | -0.36 |
|  | b* | 0.13 | 0.40 | 4.12 |
|  | YI | 0.67 | 0.73 | 8.00 |
| Gloss | Angle de 85° | 4.3 | 1.8 | 2.6 |
| UV-Test 12 hours Colours | L |  | 88.22 | 87.88 |
|  | a* |  | -0.25 | -0.57 |
|  | b* |  | 1.24 | 4.97 |
|  | YI |  | 2.33 | 9.52 |
| Basis Weight | gsm | 199 | 232 |  |
| Density | kg/m3 | 743 | 787.0 |  |
| Porosity | sec/100 ml | 178 | >1999 |  |
| Cobb (60)  1 minute | Top | 26/ 25,6/ 25,8 | 3,5/ 3,5/ 5,2 | 11,5/ 13,4/ 11,9 |
| Dennison Pick test | Top | 19 | 13 | 13 | ns
GYPSUM PLASTERBOARD WITH A COATING SLIP AND METHOD OF MANUFACTURING

PRIORITY CLAIM

This patent application is a U.S. National Phase of International Application No. PCT/FR2005/001646, filed Jun. 29, 2005, which claims priority to French Patent Application No. 0407272, filed Jun. 30, 2004, the disclosures of which are incorporated herein by referenced in their entirety.

FIELD OF THE INVENTION

This invention relates to construction materials and in particular to the manufacture of prefabricated plasterboard comprising a plaster body and at least one exterior facing paper or cardboard coated with a coating slip or rendering.

This invention relates to plasterboard comprising at least one facing paper forming the exterior of the board, the facing paper on which a coating slip is deposited being designed to improve the visual effect of the plasterboard and/or to make possible the installation of wallpaper directly on the facing paper and on the coating slip previously deposited on the paper.

This invention also relates to the coating slip or rendering properly speaking designed to be spread or deposited on the facing paper.

This invention also relates to a manufacturing process for plasterboard comprising at least one facing paper forming the exterior of the plasterboard, a process in which a coating slip or rendering is deposited on the facing paper.

Finally, this invention also relates to a novel use of compounds that are involved in the composition of coating slips or renderings as whitening agents in a coating slip for facing paper designed for plasterboard.

BACKGROUND OF THE INVENTION

Plasterboard or panelling is well-known and traditionally realised from a body or core of gypsum plaster which is deposited, in general by pouring, between two cardboard paper supports ensuring both the mechanical maintenance or framework of the plaster as well as its exterior facing on its outer surfaces.

The fabrication of plaster panelling of this sort is well-known and in particular described in European Patent No. 0 521 804 commonly owned by the applicant of the present invention. In this European patent, provision is also made to deposit, on the exterior surface of the facing paper, a coating slip with the purpose in particular of ensuring a proper aesthetic appearance of the outer layer of the facing paper by avoiding in particular its yellowing, and by ensuring for the facing paper a proper homogeneity of white colour without for all that negatively affecting the manufacturing of the paper, its performance over time and its strength qualities, in particular mechanical.

Nevertheless, a search is constantly being made to obtain plasterboard possessing facing papers presenting good aesthetic properties of their outer layers while being of low cost.

One of the means contemplated consists in realising the facing paper by means of materials presenting a low cost and therefore of quality inferior to the materials, in particular the fibres, used previously. Now, recourse to fibres of reduced quality, in general fibres obtained from recycled paper, has the disadvantage of leading to a facing paper that is darker and less homogeneous in its mass and in its overall hue. The reduction in cost of the base paper, if it actually leads to an appreciable reduction in the cost of the plasterboard, nevertheless has the negative consequence of leading to the production of a paper presenting an external visual appearance that is darker and less homogeneous. On the whole the plaster panelling obtained thereby presents diminished aesthetic qualities.

Restoration of whiteness to paper that is of lower quality has also been contemplated, by increasing the proportion of whitening agent in the coating slip for the paper. Such an inclusion, in addition to the fact that its economic significance is debatable, is not directly envisioned because increasing the proportion of whitening agent in the coating slip for the paper is accompanied by a reduction in the porosity of the coated paper, which has the tendency to reduce the evaporation of water during the setting of the plaster. Consequently, this increases drying time, which reduces the productivity of manufacturing and therefore renders this solution unacceptable.

In other respects, the reduction in the drying properties of the paper, i.e., the increase in the value of Gurley porosity (NF ISO 5636-5) of the paper, is also expressed by risks of detachment of the paper when the plasterboard is manufactured or by the appearance of blisters.

SUMMARY OF THE INVENTION

The present invention consequently aims at remedying the various disadvantages enumerated already and at offering a novel plasterboard as well as a novel coating slip and a novel manufacturing process for plasterboard which, although of reduced manufacturing cost, presents excellent properties of finish and visual appearance, in particular of whiteness, while being easy to manufacture and preserving its integrity over time.

A feature of the present invention is providing a novel plasterboard and a novel manufacturing process for making the novel plasterboard, as well as a novel coating slip that makes it possible to efficaciously obtain a particularly homogeneous visual effect of this plasterboard.

The features provided by the invention are attained by means of plasterboard comprising at least one facing paper forming the exterior of the plasterboard, and a coating slip deposited on the facing paper characterised in that the coating slip contains plastic pigments as whitening agents.

The features provided by the invention are also attained by means of a coating slip designed to be coated on the upper layer of a facing paper for plasterboard characterised in that it contains plastic pigments as whitening agents.

The features provided by the invention are also attained by means of a manufacturing process for plasterboard comprising at least one facing paper forming the exterior of the board on which a coating slip is deposited on the upper surface of the facing paper characterised in that a coating slip is deposited that contains plastic pigments as whitening agents.

Finally, the features provided by the invention are attained by means of a novel use of plastic pigments as whitening agents in a coating slip for facing paper designed for plasterboard.

BRIEF DESCRIPTION OF THE DRAWINGS

FIG. 1 is a table showing the environmental conditions of the trial of Example 1 at 23° C./50% RH, with the paper coated with coating slip described hereinbelow;

FIG. 2 is a table showing an exemplary practical realization of a coating slip in accordance with Example 1;

FIG. 3 is a table showing an exemplary coating colour formulation in Example 2;

FIG. 4 is a table showing an alternate exemplary coating colour formulation in Example 3;

FIG. 5 is a table showing exemplary trial results using the coating colour formulations of FIGS. 3 and 4 for Examples 2 and 3;

FIG. 6 is a table showing a second alternate exemplary coating colour formulation in Example 4; and FIG. 7 is a table showing exemplary trial results using the coating colour formulation of FIG. 6 in Example 4.

DESCRIPTION OF THE INVENTION

Other features and advantages of the present invention will appear in more detail upon reading of the description of the exemplary embodiments which follows, given purely in an illustrative and non-restrictive way.

This invention has, in one exemplary embodiment, a plasterboard formed from a body or core of plaster poured within appropriate fittings, between two exterior frames formed, as a general rule, of sheets of paper or cardboard, thus taking care of both the exterior facing of the plasterboard and its supporting framework.

Such plasterboard is traditionally used as construction material and is used to form partitions or ceilings, or to form linings, in particular insulation.

The manufacture of these boards is generally realised through a set of standard operations involving, as is well known by those skilled in the art, a pouring of plaster on one of the facing papers, then the installation of the second facing paper, and then finally the drying of the board leading to a heavy evaporation of water and to the production of the final construction board after setting.

The overall steps in manufacture are well described in European Patent No. 0 521 804.

In the present invention, the plasterboard has at least one facing paper forming the exterior of the board and, more preferably, two facing papers arranged on both sides of the plaster body.

The facing paper used is, more preferably, a multi-layered paper that can, for example, be formed by stacking two or more layers, and in particular two to nine layers without the number of layers being restrictive.

In a particularly advantageous way, the facing paper of plasterboard as set forth in the invention will be formed by a succession of two layers, it being understood that within the meaning of the invention use can also be made of a stacking of three or five layers without exiting the framework of the invention.

The characteristics of the paper, given below in a non-restrictive way, such as, for example, its grammage (NFQ03-019), or its thickness (NFQ03-016), its water absorption properties, whether it is a matter of its properties for absorption of water on the surface in contact with the sheet of plaster or Cobb three minutes (NFQ03-014), or of its properties for absorption of water on the exterior surface or Cobb three minutes (NFQ03-014), its permeability to air (Gurley porosity—NFISO-5636-5), its resistance to breakdown measured according to standard (NFQ03-004), its inter-fold strength, its elongation under water measured after one minute at 23° C. in the transverse direction (NFQ03-063), etc., are adapted to withstand the presence and evaporation of water as well as the various manufacturing operations.

By way of non-restrictive examples, the grammage of the base paper is to be between 100 and 250 g/m$^2$, and preferably, the grammage is to be between 160 and 200 g/m$^2$, and still more preferably, the grammage is to be between 180 and 200 g/m$^2$.

In a general way, the production of a low-cost plasterboard, compared to the usual plasterboards, involves the use of low-cost facing paper, which correlatively implies recourse to fibres of reduced quality leading in the end to paper of overall colour that is darker and, for example, of the order of 50 to 70 ISO (ISO 2469/2470), and, for example, of the order of 60.

The upper layer of the facing paper designed to form the exterior of the plasterboard, and which will therefore be the visible surface of the board, will be realised from a mixture of bleached or semi-bleached recycled fibres such as white clippings or outdated office paper. The papers, references and nomenclatures of the papers cited in European Patent No. 0521804, by the same applicant, are fully applicable here (group C and, in particular, C7 to C9 and C11, C12, C14 to C19).

The upper layer can also be realised from recycled unprinted office paper or from newsprint. By way of information, other usable fibres or pulps might be bleached or semi-bleached virgin cellulose fibres such as chemical-mechanical fibres, thermomechanical fibres or thermomechanical chemical fibres.

The base grammage of the upper layer can be approximately within the range of 20-90 g/m$^2$ and preferably between approximately 30 to 50 g/m$^2$. Quite obviously, and as is known to those skilled in the art, the grammage of the upper layer of the facing paper will play a very important role in the production of the final whiteness of the paper and those skilled in the art will adapt the grammage of the upper layer in terms of the grammage and properties of the other layers, as well as in terms of the properties of the coating slip. In a non-restrictive way, the whiteness of the upper layer is to be between 65 to 68 ISO.

The layer of paper that is in contact with the plaster (gypsum) will be preferably made from old corrugated cardboard, or from recovered raw material originating in household use and including, for example, packaging for liquids, or similar types of fibres, or a mixture of these fibres that can give the required solidity and porosity to these layers.

The upper facing surface or upper ply of the paper, which makes up the exposed surface of the plasterboard, is designed to accept a coating slip that will confer superior aesthetic qualities on this surface and in particular one or more qualities chosen from among:

a surface with confirmed and homogeneous whiteness;

a surface that does not yellow with use or only with difficulty, in particular on account of UV radiation;

a surface that precludes the subsequent application of a primer;

a surface easy to clean;

a surface that makes possible the installation and especially the removal of wallpaper without degradation of the layer of paper, and which in particular makes possible the successive removal of several layers of paper without major degradation; or a surface that does not require being painted immediately after installation of the plaster board or panelling.

The coating slip is in a position to fulfill the already stated objectives without degrading the qualities and functions of the paper in relation to its role as framework and for the draining of water during drying of the plaster.

The coating slip can be deposited to best advantage in a proportion of approximately 25 to 30 g/m$^2$, its application being quite obviously dependent on the degree of initial whiteness of the paper; the whiter the base paper, the less the application of the coating slip need be. The degree of whiteness of the coated paper, i.e., coated with the coating slip, can have an ISO gloss index between 75 and 85 and preferably between 78 and 80.

The application of the coating slip is to be carried out according to the usual techniques used in the field such as by air knife or by roller or by blade or by spraying or other means, or by a combination of one or more of these techniques well-known to those skilled in the art and referenced, for example, in European Patent No. 0 521 804.

As set forth in the present invention, the plasterboard comprises at least one facing paper forming the exterior of the plasterboard as well as a coating slip deposited on the facing paper comprises a coating slip that contains plastic pigments as whitening agents.

The application of plastic pigments through the coating slip restores a good degree of whiteness to the facing paper in a homogeneous fashion without an appreciable drop in the porosity of the paper corresponding to an elevated Gurley value. This turned out to be surprising because the use of plastic pigments in coating slips designed for facing papers for plasterboard was not known in the art, and a negative effect as far as paper porosity is concerned could certainly be expected. Now, it turned out on the contrary that whiteness could be given or restored to the facing paper even in situations in which the facing paper is of a relatively dark colour, because it is possible, without fear of significantly negative side-effects as far as porosity is concerned, to incorporate elevated levels of plastic pigments in the coating slip. The present invention also relates to a coating slip containing plastic pigments as whitening agents. The coating slip set forth in the present invention and/or the plasterboard comprises at least one facing paper on which a coating slip is deposited is to be such that the coating slip contains at least 5% by weight of plastic pigments.

It is recognized that advantageous industrial effects have been perceptibly obtained from 5% by weight of plastic pigments in the coating slip, even if, as far as improvement of paper whiteness is concerned, an effect can be obtained at a lower level.

The coating slip and the plasterboard comprises the facing paper on which the coating slip is deposited contain between 5 and 40% by weight of plastic pigments, and more preferably between 15 and 25% by weight of plastic pigments.

As mentioned hereinabove, the coating slip is to be applied in the proportion of approximately 10 g/m$^2$ to 45 g/m$^2$, and more preferably in the proportion of approximately 20 to 30 g/m$^2$, and in an even more preferential way, in a proportion of 25 to 30 g/m$^2$.

The plastic pigments, also designated as organic pigments as opposed to inorganic pigments such as clay, talc or calcium carbonate, for example, are synthetic polymeric latexes whose vitreous transition point is sufficiently high so as to give to these latexes one or more non-film-forming properties making it possible for the particles composing this type of latex to remain separate.

The plastic pigments or organic pigments that can be used in the coating slip set forth in the present invention can be chosen from among plastic pigments available on the market, and in particular from among plastic pigments with filled particles or with hollow particles. Preferably, the plastic pigments will be formed from hollow particles, i.e., comprising a free internal volume.

By way of non-restrictive example, the plastic pigments used in the coating slip can be plastic pigments sold under the ROPAQUE® HP-1055 brand name available from the Rohm & Haas company, or plastic pigments corresponding to the ROPAQUE® BC-643 brand of the same manufacturer. Other compounds can quite obviously be used without exiting the overall framework of the invention.

The plastic pigments are to be included and mixed in a coating slip and comprise, in addition to the plastic pigments:
- at least 25% and preferably at least approximately 30% of fillers, preferably of calcium carbonate, and more preferably at approximately 44%;
- a quantity of water;
- a dispersing agent;
- a defoamer agent;
- at least 8% of binder (more preferably styrene-butadiene and more preferably at approximately 16%);
- an insolubilising agent, more preferably an epoxy-aliphatic resin; and
- a biocide, more preferably an organo-sulfurated/nitrogenous agent (organosulphur/azotee).

By way of inorganic filler, it is possible to use, in place of calcium carbonate, any equivalent filler such as, for example, calcium sulphate dihydrate in any form.

As a binder, it is essentially possible to use synthetic binders, and in particular synthetic latexes (styrene-butadiene or styrene-acrylic, in particular). Thus, in place of styrene-butadiene or in combination with it, it can be obviously conceivable to use other synthetic latexes and, more generally, all polymeric materials customarily employed, and, for example, synthetic polymeric materials such as polyvinyl acetates and polymers of acrylic monomers as well as polymeric materials of natural origin, such as, speaking non-restrictively, amylaceous polymers, modified or not, casein-type proteins or a mixture of synthetic polymeric materials and polymeric materials of natural origin. The proportion of synthetic binders can be significantly increased in the coating slip compared to coating slips known to prior art.

Thus, plasterboard according to the present invention may comprise a binder formed of a synthetic latex or a combination of synthetic latexes, the binder(s) being preferentially included in the coating slip, in the proportion of at least 10% and more preferably at least 12% by weight.

The synthetic latexes are included in the proportion of at least 15% by weight in the coating slip. The binder is preferably made of styrene-butadiene included in the proportion of approximately 15 to 16% by weight in the coating slip (FIG. 2).

This addition, significantly higher than standard percentages of addition, improves the resistance of the coated paper to sanding and therefore of the plasterboard without, surprisingly, the observation, as might have been expected, of a corresponding closure of the paper leading to a prolongation of the drying time. Moreover, the performance of jointing renderings on plasterboards comprising a paper coated with a coating slip comprising that high a proportion of latex, is not affected and is at least comparable to the performance on known plasterboards.

In addition to the components already indicated, the coating slip may contain secondary components that may or may not be present in the coating slip.

In this way, the coating slip may additionally contain titanium dioxide, acting as filler, in the proportion of 10% by weight.

The coating slip may also contain a pH agent, for example, sodium hydroxide, in the proportion, for example, of less than 1% by weight in the coating slip.

The coating slip may also contain ammonium as a fluidifier. The ammonium can be included at a very low level.

Finally, the coating slip may additionally contain oxidised maize starch acting as a binder, as a supplement to the styrene-butadiene, more preferably in the proportion of approximately 15% by weight.

The present invention will be further described in connection with the following examples, which are set forth for purposes of illustration only. Parts and percentages appearing in such examples are by weight unless otherwise stipulated.

EXAMPLES

Example 1

FIG. 2 below gives an example of practical realisation of a coating slip in accordance with the present invention.

The values in column 9 relating to "fractions" expresses the composition of the coating slip such as is traditionally used in the field, as percentage of the dry matter of the component as a function of the value of the dry matter of the pigment, whose reference is given as being equal to 100.

In the case in which there are several types of pigments in the coating slip, the sum of their relative values is also indicated as being the 100 reference and the values of the other components of the coating slip is calculated as a function of this.

In this case, the plastic pigment therefore represents 20% of the dry extract of the total of the three fillers used, which is in total 193.769 kg (sum of the dry matter of the totality of the fillers in the composition), which corresponds to approximately 13% by weight of plastic pigments referred to the totality of the dry formulation.

As filler, the coating slip contains approximately 44% calcium carbonate and approximately 16% styrene-butadiene as binder.

The plastic pigment (ROPAQUE® HP-1055) is composed of polymeric pigments of acrylic styrene with particles on the order of 1.0 micrometers in diameter with a 55% void volume.

The coating slip was deposited by an air knife system after addition of a supplementary quantity of water in order to reduce the viscosity of the coating slip, for example on the order of 80 liters on a facing paper presenting the characteristics shown in FIG. 1 below.

The deposition was done in the proportion of approximately 29 g/m².

The values shown in FIG. 1 were obtained in accordance with the standards in force, namely:
  porosity: (Gurley value) NF ISO 5636-5;
  Cobb: ISO 535;
  Dennison test: TAPPI 459; and
  colour measurements: in accordance with standard T527 OM94 (TAPPI), the colour system being expressed according to the CIE L*, a*, b* system.

Study of the results shows that the measured colour indices of the coated paper were significantly elevated, whereas the porosity of the paper remained within acceptable values since the porosity (Gurley value) of the paper went from 67.4 s/100 ml (uncoated paper) to 137.8 s/100 ml (coated paper).

The initial value of whiteness of the paper, which was 84.27 (the value 0 corresponds to black and the value 100 to perfectly white) went, for its part, to 89.23.

The other representative values of the colour measurement a* for grey and b* for blue were also distinctly improved.

It consequently turned out that inclusion of a plastic pigment whitening agent in the coating slip and the application of this coating slip to a base paper specifically designed for plasterboard and produced from fibres of reduced quality, for example unbleached recycled fibres, makes it possible to give, efficaciously and inexpensively, a good degree of whiteness to the facing paper of plasterboard. This addition can be made without fear of negative side-effects on the quality of the paper, in particular its qualities and properties of porosity, and this even at the elevated quantities of addition that can be required in the case of particularly dark base papers. It is therefore not only possible to restore whiteness to the facing paper, but also to do so efficaciously.

Example 2

FIG. 3

This example does not differ practically from Example 1, the composition of the coating slip being unchanged, only certain trade names of products having changed and having come from different suppliers (and therefore with different references) for calcium carbonate, and the binder (oxidised maize starch). The other conditions are essentially unchanged with respect to Example 1.

The results shown in FIG. 5 for this Example 2 also show a significant elevation in the whiteness of the paper after coating and of the plasterboard. The paper used presents a grammage of 195 g/m² and the coating slip was deposited in the proportion of 30 g/m² according to the procedure already described.

Example 3

FIG. 4

The composition of the coating slip is similar to that of Examples 1 and 2, except for the binder content, since the oxidised maize starch was omitted as well as the associated component, namely sodium hydroxide (fluidifier) which proportions were reduced. The proportions of the other components remained essentially identical in this coating slip.

This coating slip was coated according to the procedure already described in the proportion of 23 g/m² on a base paper with grammage on the order of 195 g/m². The addition of plastic pigments contributes to the significant increase in the whiteness of the paper as shown in FIG. 5.

The results shown in FIG. 5 are also interesting in their comparative character between Examples 2 and 3 because the measurements carried out originate in batches of identical papers and identical plasterboards on which the coating slips of Examples 2 and 3 were coated. The regulatory effect of oxidised maize starch on the whiteness of the paper is then noticed, this regulatory effect being particularly clear on the gloss of the coated paper.

Example 4

FIG. 6

In this example, the addition of plastic pigments has been greatly reduced, and it only represents 4.15% (5 parts) by weight of the coating slip. In spite of this reduced level of addition, it is possible to observe (see FIG. 7) a significant elevation in the whiteness of the coated paper and of the plasterboard produced, thus marking the preponderant effect of the plastic pigments. The heavy reduction in the content of plastic pigments also explains the low gloss value in relation to the high filler content.

Trials of Capacity for Painting

Trials of application of paint were also conducted on coated paper by means of FASTOATIN™ acrylic paint available from the Tollens Company.

The application of paint proved to be particularly easy and the level of covering was very good. After drying, the area having undergone application is appreciably whiter than the facing paper of the plasterboard, the overall result being excellent. No particular problem in application of the second layer was noted, the results still being excellent.

Trials on Detachment and Removal of Wallpaper

Trials for the purpose of evaluating the strength and the maintenance of integrity of the facing paper during removal and detachment of wallpaper were also conducted.

The paper used was a standard wallpaper available from Castorama.

Surface active agent: PERFAX™ available from Henkel.
Dilution of the product: 40 ml for 4 l of water.
The adhesive used was an ordinary MÉTYLAN® adhesive available from Henkel.

The initial attempt at detaching and stripping the paper showed that the surface active agent had the tendency to act rapidly on the plasterboard.

It is also possible to proceed by spraying the surface active agent.

In all cases, it proved to be almost impossible to damage or harm the facing paper of the plasterboard.

After an initial removal of the wallpaper, the gluing of a second layer of wallpaper was carried out, under the same conditions as the first operation.

Stripping of this second layer also did not pose any particular problem, the facing paper still reacting rapidly and very well to the surface active agent, in such a way that it was still possible to withdraw this second layer of paper extremely easily. The only two areas of degradation of the facing paper were caused by the damage created by the stripping knife used for the operation.

Trials of Resistance to Sanding

Trials on the mechanical resistance to sanding by the facing paper were carried out on standard plasterboards as controls and on plasterboards fitted with facing paper in accordance with the present invention and on which a coating slip was deposited in accordance with the present invention.

The results show that the two plasterboards lost essentially the same weight through mechanical erosion, namely, approximately 0.2 g. In other respects their behaviour was essentially identical.

The entire set of these trials clearly shows, in addition to the good whiteness obtained with the use of plastic pigments, that the mechanical properties of overall strength of the paper are preserved.

The present invention also relates to a manufacturing process for plasterboard comprising at least one facing paper forming the exterior of the plasterboard on which a coating slip is deposited on the upper surface of the facing paper.

The manufacturing process set forth in the present invention is characterised in that a coating slip containing plastic pigments is deposited in the capacity of a whitening agent. The coating slip contains at least 5% by weight of plastic pigments.

Preferentially, the manufacturing process set forth in the present invention is characterised in that the coating slip applied contains between 5 and 40% by weight of plastic pigments, and, more preferably, between 15 and 25% by weight of pigments. The application of the coating slip is carried out in the proportion of 10 to 45 g/m$^2$, more preferably in the proportion of approximately 20 to 30 g/m$^2$, and even more preferably in the proportion of 25 to 30 g/m$^2$. Even more preferably, an application of coating slip on the order of approximately 29 g/m$^2$ is carried out.

Application of the coating slip is handled according to one of the techniques discussed hereinabove.

According to the process of the present invention, the binder is formed from a synthetic latex or a combination of synthetic latexes, the binder being incorporated in the coating slip in the proportion of at least 12% by weight.

According to the process of the present invention, the synthetic latexes are incorporated in the coating slip in the proportion of at least 15% by weight, the binder being more preferably styrene-butadiene.

Within the meaning of the present invention, the expression "manufacturing process for plasterboard" comprises not only the industrial manufacturing steps for the plasterboard, essentially involving the pouring of the plaster within its frame and the drying of the plasterboard, but also the steps prior to manufacture of the frame corresponding to the manufacture of the facing paper.

Application of the coating slip can therefore take place indifferently during any of these steps.

The manufacturing process set forth in the present invention is further characterized in that the application of the coating slip is handled before the operation of pouring the plaster core or after the formation of the plasterboard. Before pouring the plaster, the paper can be coated with the coating slip on the same production line or on another completely independent production line, indeed in another manufacturing plant where the paper is manufactured. The coating of the paper can thus take place at the stage of manufacture of the paper, well before the assembly process of the plasterboard properly speaking, including the pouring of the plaster.

The coating operation can in fact take place on the paper support ensuring the mechanical maintenance of the plasterboard before or essentially during the pouring of the gypsum plaster core and, therefore, before the industrial drying of the plasterboard. Application of the coating slip can also take place after the pouring operation, once the plasterboard is formed, before the industrial drying or even after the industrial drying, but during the industrial manufacturing process.

The present invention also relates to a novel use of plastic pigments as whitening agents in a coating slip for facing paper designed for plasterboard. The use of such pigments was not in fact known in coating slips for the specifically intended application, namely deposition on papers used during the manufacture of plasterboard.

The invention may be used in the manufacture of plasterboards comprising at least one facing paper, in the manufacture of coating slips designed to be coated on the facing papers, in the manufacturing processes for plasterboards comprising at least one facing paper and in the use of plastic pigments as whitening agents in a coating slip for facing paper in a plasterboard.

All patents, applications and publications referred to herein are incorporated by reference in their entirety.

The invention claimed is:

1. A plasterboard, comprising: at least one facing paper forming the exterior of the plasterboard; and, a coating slip deposited on the facing paper, the coating slip comprising
   a) at least 25% of at least one filler;
   b) a sufficient quantity of water;
   c) a dispersing agent;
   d) a defoamer;
   e) at least 8% of at least one binder;
   f) an insolubilising agent
   g) a biocide; and
   h) plastic pigments as whitening agents.

2. The plasterboard of claim 1, wherein the coating slip is at least 5% by weight of plastic pigments.

3. The plasterboard of claim 1, wherein the coating slip is between 5% and 40% by weight of plastic pigments.

4. The plasterboard of claim 1, wherein the coating slip is approximately 13% by weight of plastic pigments.

5. The plasterboard of claim 1, wherein the coating slip is deposited in the proportion of approximately 10 to 45 g/m$^2$.

6. The plasterboard of claim 1, wherein the plastic pigments are selected from the group consisting of plastic pigments with filled particles, plastic pigments with hollow particles or any combination thereof.

7. The plasterboard of claim 1, wherein the at least one binder is formed from at least one synthetic latex, the binder being at least 10% by weight.

8. The plasterboard of claim 7, wherein the at least one synthetic latex is at least 15% by weight.

9. The plasterboard of claim 1, wherein the binder contains styrene-butadiene.

10. The plasterboard of claim 1, wherein the coating slip further comprises titanium dioxide in the proportion of approximately 10% by weight.

11. The plasterboard of claim 1, wherein the coating slip further comprises sodium hydroxide.

12. The plasterboard of claim 1, wherein the coating slip further comprises ammonium.

13. The plasterboard of claim 1, wherein the coating slip further comprises oxidized maize starch.

14. A coating slip designed to be coated on the upper layer of a facing paper of a plasterboard, the coating slip comprising:
   a) at least 25% of at least one filler;
   b) a sufficient quantity of water;
   c) a dispersing agent;
   d) a defoamer;
   e) at least 8% of at least one binder;
   f) an insolubilising agent; and
   g) a biocide; and,
   h) plastic pigments as whitening agents.

15. The coating slip of claim 14, wherein the binder is formed from a synthetic latex or a combination of synthetic latexes, the binder being incorporated in the coating slip in the proportion of at least 10% by weight.

16. The coating slip of claim 15, wherein the synthetic latex or the combination of synthetic latexes are incorporated in the proportion of at least 15% by weight in the coating slip.

17. The coating slip of claim 15, wherein the binder contains styrene-butadiene.

18. The coating slip of claim 14, wherein the coating slip further comprises titanium dioxide in a proportion of approximately 10% by weight.

19. The coating slip of claim 14, wherein the coating slip further comprises sodium hydroxide.

20. The coating slip of claim 14, wherein the coating slip further comprises ammonium.

21. The coating slip of claim 14, wherein the coating slip further comprises oxidised maize starch.

\* \* \* \* \*